United States Patent
Bothorel et al.

(10) Patent No.: US 6,718,056 B1
(45) Date of Patent: Apr. 6, 2004

(54) METHOD OF AUTOMATIC DETERMINATION OF THE CONTRAST AND BRIGHTNESS OF A DIGITAL RADIOGRAPHIC IMAGE

(75) Inventors: Sylvie Bothorel, Boulogne-Billancourt (FR); Serge Muller, Guyancourt (FR); Jean Lienard, Clamart (FR); Andreas Rick, Plaisir (FR); François Nicolas, Palaiseau (FR)

(73) Assignee: GE Medical Systems SA, Buc (FR)

( * ) Notice: Subject to any disclaimer, the term of this patent is extended or adjusted under 35 U.S.C. 154(b) by 0 days.

(21) Appl. No.: 09/450,489

(22) Filed: Nov. 29, 1999

(30) Foreign Application Priority Data

Nov. 27, 1998 (FR) ............................................ 98 14996

(51) Int. Cl.$^7$ ................................................ G06K 9/00
(52) U.S. Cl. .................................... 382/132; 382/128
(58) Field of Search .............................. 382/168, 172, 382/128, 131, 132; 378/23, 21, 87, 89

(56) References Cited

U.S. PATENT DOCUMENTS

| | | | |
|---|---|---|---|
| 4,887,305 A | 12/1989 | Shimura | 382/51 |
| 5,544,219 A | 8/1996 | Muller et al. | 378/210 |
| 5,615,279 A * | 3/1997 | Yoshioka et al. | 382/131 |
| 5,696,805 A | 12/1997 | Gaborski et al. | 378/54 |
| 6,215,900 B1 * | 4/2001 | Schwenker et al. | 382/168 |
| 6,269,140 B1 * | 7/2001 | Takagi et al. | 378/8 |

FOREIGN PATENT DOCUMENTS

| | | |
|---|---|---|
| DE | 3214725 | 10/1983 |
| EP | 0374328 | 6/1990 |
| NO | 9837738 | 8/1998 |

OTHER PUBLICATIONS

Lienard, J., LSD/AAP Reference 98030 Technical Note, GE Medical Systems, Aug. 26, 1998, "Mammography Histogram Understanding".

* cited by examiner

Primary Examiner—Leo Boudreau
Assistant Examiner—Tom Y. Lu
(74) Attorney, Agent, or Firm—Jay L. Chaskin; Cantor Colburn LLP

(57) ABSTRACT

The method comprises a histogram of the radiographed image, i.e., a real histogram, a mathematical model of the image chain and the object obtained by calibration. The mathematical model of the image chain and the object and a set of parameters of acquisition, of the detector, of the positioner and of the object are used to determine two values of gray level, gray min and gray max, delimiting a useful zone and the part below gray min and the part above gray max are suppressed in the real histogram, i.e., a limited histogram. A set of rules is applied to the limited histogram in order to determine the level of brightness (WL) and the contrast (WW) is obtained from the brightness and possibly from one or more parameters selected by the user or fixed a priori.

15 Claims, 3 Drawing Sheets

METHOD OF AUTOMATIC DETERMINATION OF THE CONTRAST AND BRIGHTNESS OF A DIGITAL RADIOGRAPHIC IMAGE

CROSS-REFERENCE TO RELATED APPLICATIONS

This application claims the benefit of a priority under 35 USC 119(a)–(d) to French Patent Application No. 98 14996 filed Nov. 27, 1998, the entire contents of which are hereby incorporated by reference.

BACKGROUND OF THE INVENTION

This invention relates to a method for automatic determination of the brightness and contrast of a digitized radiographic image of an object.

It finds a particularly interesting application in the medical field in which fine analyses of radiographic images are made, notably. mammography.

In the medical field, diagnoses generally are based on the study of a radiographic image. The progress of digital systems now makes it possible to vary the characteristics of the image in order to best effect a diagnosis. Thus, it is evident that the quality of the image is an essential point.

As is well known, image acquisition introduces numerous parameters related to the acquisition chain: These include the parameters of acquisition (target material of the anode of the X-ray tube [track], material and thickness of the filter at the output of the X-ray tube [filter], voltage applied between cathode and anode of the X-ray tube [kV], heating current of the filament of the cathode of the X-ray tube [mA], exposure time, . . . ), the parameters of the positioner (incidence of the view, enlargement factor, type of compression pad used, thickness of the object, force of compression, . . . ) and the parameters of the digital detector (relation of gray levels to flux of X-rays captured . . . ). In addition to this, the parameters of the object, in particular its composition, are introduced. This set of parameters makes it possible to obtain an image that is in fact composed of pixels of shades of gray. Quantification of the image is obtained on a given number of gray levels. When the image is displayed on a screen or imprinted on a film using a given range of gray levels, the contrast perceived may be considerably different among images of the same object acquired with different sets of parameters of acquisition or among images of different objects obtained with the same set of parameters. In addition, selection of the range of gray level to be considered for the screen is of great importance in order to give an acceptable perception of contrast in the image. Thus, once the image has been obtained, the user interactively modifies the brightness (WL: window level) and the contrast (WW: window width) of this image in order to adjust the range of gray levels in it so as to obtain a correct perception of contrast.

Generally, for more than 16000 different gray levels, it is a difficult and lengthy task to select the correct brightness and contrast manually.

SUMMARY OF THE INVENTION

An embodiment of the invention permits automatically determining the value of the brightness (WL) and to derive the contrast (WW) from it.

An embodiment of the invention therefore proposes a method of digital radiographic image acquisition of an object with automatic adjustment of the parameters of visualization (brightness, contrast). The method is adaptable, since the wishes of the user may be taken into account.

This method comprises the obtaining of two gray levels, min gray and max gray, revealing a zone of gray levels in which the brightness (WL) is capable of being determined, a set of rules for calculation of the value WL, and from this, lastly, the derivation of a range of gray levels for the contrast WW.

BRIEF DESCRIPTION OF THE DRAWINGS

Other advantages and characteristics of the invention will appear upon examination of the detailed description of a mode of implementation, in no way limitative, and of the accompanying drawings, wherein.

DETAILED DESCRIPTION OF THE INVENTION

Figure 1:
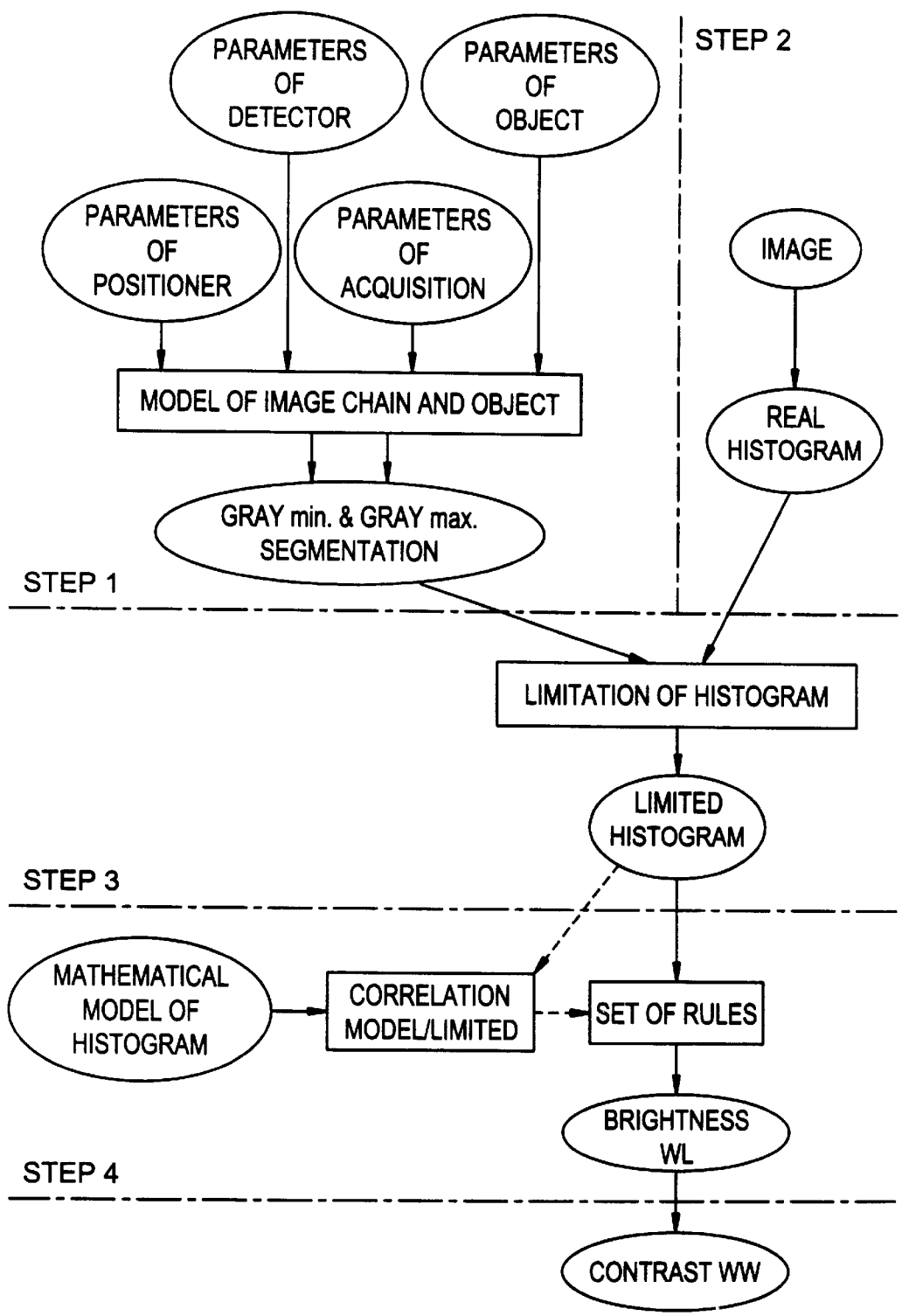
FIG. 1 is a flow chart of a mode of implementation of the method according to an embodiment of the invention.

According to a general embodiment of the invention, a first step, segmentation, is carried out. The input data of this first step are the parameters of acquisition, the parameters of the digital detector, the parameters of positioning and the parameters of the object. All of these parameters are input in a pre-established mathematical model of the image chain and of the object.

The model makes it possible to determine a gray min level and a gray max level. The part surrounded by these two levels is the useful zone of gray levels within which the value of the level of brightness WL will be selected.

This step corresponds to segmentation of the image by double thresholding so that only the points of the image having gray min level and gray max level are preserved.

A second step is carried out in parallel with the preceding step. It performs the real radiographic acquisition of the object. From the image obtained, a histogram is drawn up, i.e., a real histogram.

The third step introduces gray min, gray max and the real histogram. Their correlation results in suppression in the real histogram of the part below the level of min gray and of the part above the level of max gray. The result of the third step is an interval of gray levels limiting the useful zone, i.e., limited histogram. The value of the brightness WL within this interval then remains to be determined.

Accordingly, the fourth step concerns the determination of WL, which may be done by means of a set of simple rules known to persons skilled in the art. This set of rules makes it possible to obtain a value WL. However, when the user performs numerous mammographies, it is necessary to improve efficiency by introducing a mathematical model of the histogram. One model is described by Mr. Jean Lierrard, LSD/AAP reference 98030 Technical Note GE Medical Systems, August 1998. It considers a compressed breast, the shape of which is modeled, for example, with the aid of simple geometric forms. When data of the breast to be mammographed are introduced, a histogram model characterized by a maximum at the level of radiologic thickness corresponding to a breast tissue is obtained.

Correlation of the mathematical model of the histogram so determined and the limited histogram makes it possible to determine the value of a radiologic thickness characterizing the breast.

The limited histogram, thus refined, will be subject to a set of rules permitting determination of the brightness WL.

The fifth step concerns determination of the contrast WW. This value may be obtained in a manner known to those skilled in the art by introducing the value WL and any parameters known a priori and dependent upon the user.

According to one mode of implementation of the invention, the contrast WW may alternatively be determined independently of WL. In this case, the coefficient of mean attenuation ($\mu$ mean), dependent upon the spectrum, is used. In a general way, the WW thus obtained is a function of the spectrum, because it is proportional to $\mu$ mean.

Obtaining WL and WW (independently of WL) is equivalent in fact to an auto-contrast operation that may be used in a method of perception of contrasts in invariant thickness.

An embodiment of this method makes the perception of contrasts independent of the conditions of acquisition and of the object. For two objects of different thicknesses, it is desired that regardless of the conditions of acquisition, the contrast perceived on the image should remain faithful to their difference in real thicknesses.

In other words, it is desired that a given thickness should always represent the same perception of contrast, regardless of what the object and the conditions of acquisition are.

In effect, in the course of image acquisition, the physical elements cause the spectrum to convert the real thickness of the object into radiologic thickness, thus resulting in a perception of unfaithful contrast. This is an effect of exponential attenuation. The effect is compensated for by introducing into an image chain a change-of-space step in order to annul the exponential attenuation due to interaction of the X-rays with the object by employing a modified logarithmic function. The change of space makes it possible to leave the exponential space to pass into the space of radiologic thicknesses.

Likewise introduced is a visualization step making it possible to pass from the space of radiologic thicknesses to the space of real thicknesses. This change of space is possible because WW is proportional to the coefficient of mean linear attenuation of the object studied and independent of WL.

Although the invention is not limited, the method is applicable to the automatic determination of the brightness WL and of the contrast WW for a mammography.

As shown in FIG. 1, the first step employs a mathematical model of the image chain and the object with, in input data, the following parameters:

thickness of the compressed breast and parameters of the positioner (incidence of the view, enlargement factor, type of compression pad used, thickness of the object, force of compression, . . . ) as parameters of the positioner, parameters of the detector (relation between the flux of X-rays received on the detector and the gray levels of the image produced, . . . )

parameters of acquisition (track, filter, kV, mAs, . . . )

parameters of the object (mechanical thickness of the breast, minimum $\mu$ min and maximum $\mu$ max values of the coefficient of linear attenuation of the object, . . . ).

Since the breast is composed principally of fibrous and adipose tissues, if there is no information on the composition of the breast, $\mu$ min and $\mu$ max may be estimated by making two extreme assumptions.

$\mu$ min corresponds to the coefficient of linear attenuation of the least attenuant tissues of the object (adipose tissues for the breast) for the energies of the X-ray spectrum determined by the parameters of acquisition.

$\mu$ max may be estimated in two ways: on the one hand like $\mu$ min, by considering that $\mu$ max corresponds to the coefficient of linear attenuation of the most absorbent tissues of the object (fibers for the breast) for the energies of the X-ray spectrum determined by the parameters of acquisition; on the other hand, in a more precise manner, from a mathematical model of the image chain, the mechanical thickness of the compressed breast, the parameters of acquisition and a quantity of photons obtained following pre-exposure performed on a zone of maximum density (which makes it possible to estimate the value of the coefficient of linear attenuation corresponding to the most attenuant zone of the object).

Figure 2:
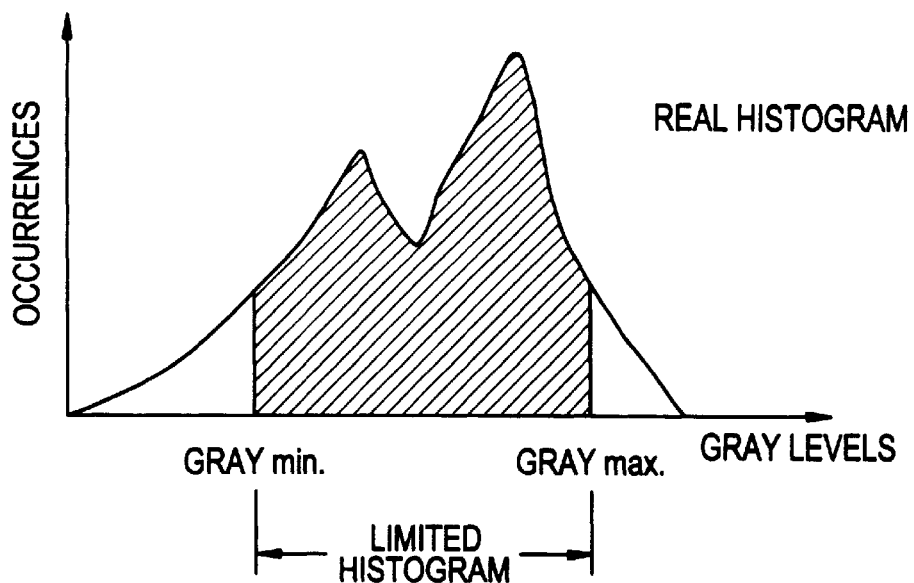
FIG. 2 illustrates the limited histogram with respect to the real histogram.

The set of parameters introduced into the mathematical model of the image chain and the object makes it possible to have two values of gray levels, gray min and gray max, at the output (FIG. 2). These two values, as a matter of fact, delimit the useful zone, which is a zone of gray levels relating really to the breast. In effect, owing to the two extreme values of the composition of the breast, $\mu$ min and $\mu$ max, a zone delimited by two extreme values, gray min and gray max, has been obtained, outside of which the gray levels do not correspond to the breast. More precisely, the part of gray levels below gray min corresponds to objects more attenuant than the object of interest, and the part of gray levels above gray max corresponds to the bottom of the image. This step is a segmentation step because it makes it possible to delimit the useful zone.

Then a correlation is effected between the two values gray min and gray max and a histogram obtained from the radiographic image of the breast, i.e., a real histogram. More precisely, the part below gray min and the part above gray max are eliminated so as to preserve only the useful zone: limited histogram (FIG. 2).

The brightness WL is a value included in the useful zone and may be obtained in a variety of ways.

Figure 3:
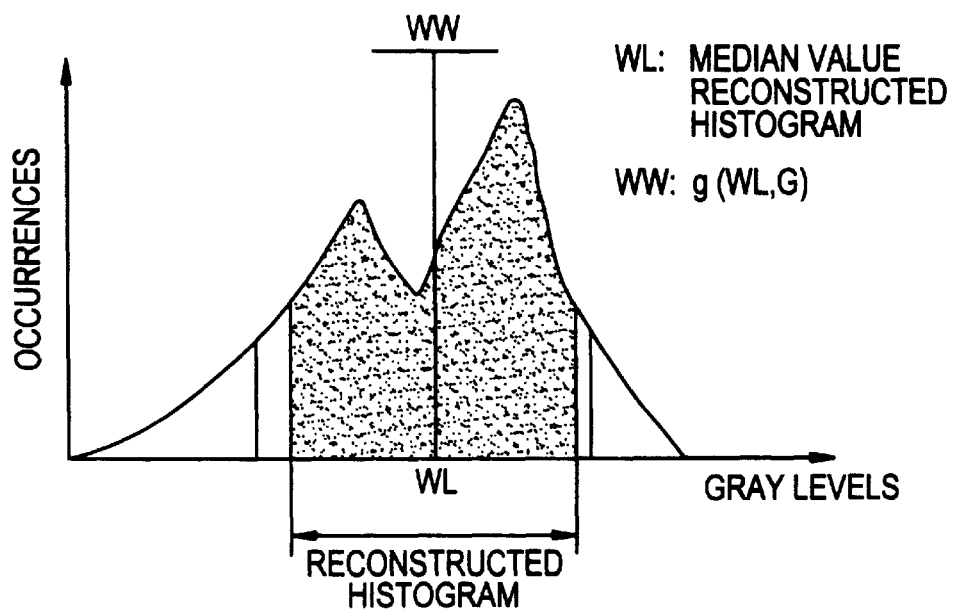
FIG. 3 illustrates a way of selecting WL.

One manner of obtaining WL is the application of a set of pre-established rules to the limited histogram. A set of rules may include:

determination of the gray level corresponding to the maximum of the limited histogram preservation of a quantity of x % (typically 95%) of occurrences of the limited histogram on the right of the maximum, and likewise x % of occurrences on the left of the maximum: a reconstructed histogram is thus obtained determination of WL as median value of the reconstructed histogram (FIG. 3).

It is alternatively possible to obtain WL with better precision by preceding the set-of-rules step by a correlation step. This step introduces a mathematical model of the histogram in which:

the shape of the breast is a cylinder generated by rotation about an axis of a rectangle of which one of the short sides is closed by a semicircle equal in diameter to the length of this short side the composition of the breast is homogeneous, for example 100% fat a histogram is established that corresponds to probability as a function of the radiologic thickness of the breast the maximum of the histogram obtained represents the maximum thickness of the breast which, multiplied by the coefficient of attenuation, gives the maximum radiologic thickness corresponding to the adipose tissue (fat).

Correlation of the two histograms (mathematical model and limited histogram) makes it possible to determine in the limited histogram the value of the maximum radiologic thickness corresponding to the adipose tissue in the breast.

This then makes it possible to determine the values of radiologic thickness of the various components of the breast.

This correlation is performed by employing a method of minimization of errors between two functions such as, for example, the method of least squares.

An appropriate set of rules can then be applied in order to determine WL. For example, WL=αE, with E representing the value of the radiologic thickness obtained from the mathematical model of the histogram.

The following step corresponds to the determination of WW by using WL. Thus, WW is obtained from a function introducing WL and possibly other parameters, in particular a parameter G (FIG. 3), which is selected by the user.

This parameter G therefore makes the method adaptable to each user.

$$WW=g(WL, G)$$

g being a function which, from WL and G, determines WW, which thus represents a range of gray levels about WL.

It is alternatively possible to determine WW independently of WL.

First, $\mu$ mean is determined from information drawn from the limited histogram. As an example, the $\mu$ corresponding to the median value of the limited histogram may be taken as $\mu$ mean.

Then, a law introducing a constant Cte is used in order to derive WW from it:

$$WW=Cte\ \mu(\text{spectrum})$$

This relation is true in a mono-energetic case but in a general way, WW is a function of the spectrum $$WW=f\ (\text{spectrum})$$

The operation of auto-contrast has thus been performed, since WL and WW have been established.

The way in which perception of the contrast of a difference in thickness remains invariant regardless of the means of acquisition and the objects will now be explained with reference to FIG. 4.

The imposition of X-rays on the object results in an exponential attenuation of the intensity I at the level of the image:

$$I=Io\ \exp\ (-\int \mu dl)$$

Io is a constant, 1 represents an infinitesimal magnitude that corresponds to a distance along the path connecting the focus of the X-ray and the detector.

$\int \mu dl$ represents the radiologic thickness for a given zone of an object.

It is this quantity that interests us. To obtain it, a pre-LUT (look-up table) operation is performed, making it possible to offset the exponential attenuation by using a modified logarithmic function. It is called modified because the lowest gray levels are converted according to a linear rotation when the logarithmic function is progressively introduced for the other gray levels.

We thus find ourselves in the space of radiologic thicknesses in which a radiologic thickness may be given the notation $\mu H$, with H the real thickness.

Lastly, a change of space must be made to get back into the space of real thicknesses.

Auto-contrast furnishes us with the values WW and WL, which are introduced at the level of a visualization LUT. The visualization LUT makes it possible to eliminate $\mu$. In the case of a mono-energetic image, this operation amounts to division by $\mu$.

This operation is possible because WW is proportional to $\mu$.

Figure 4:
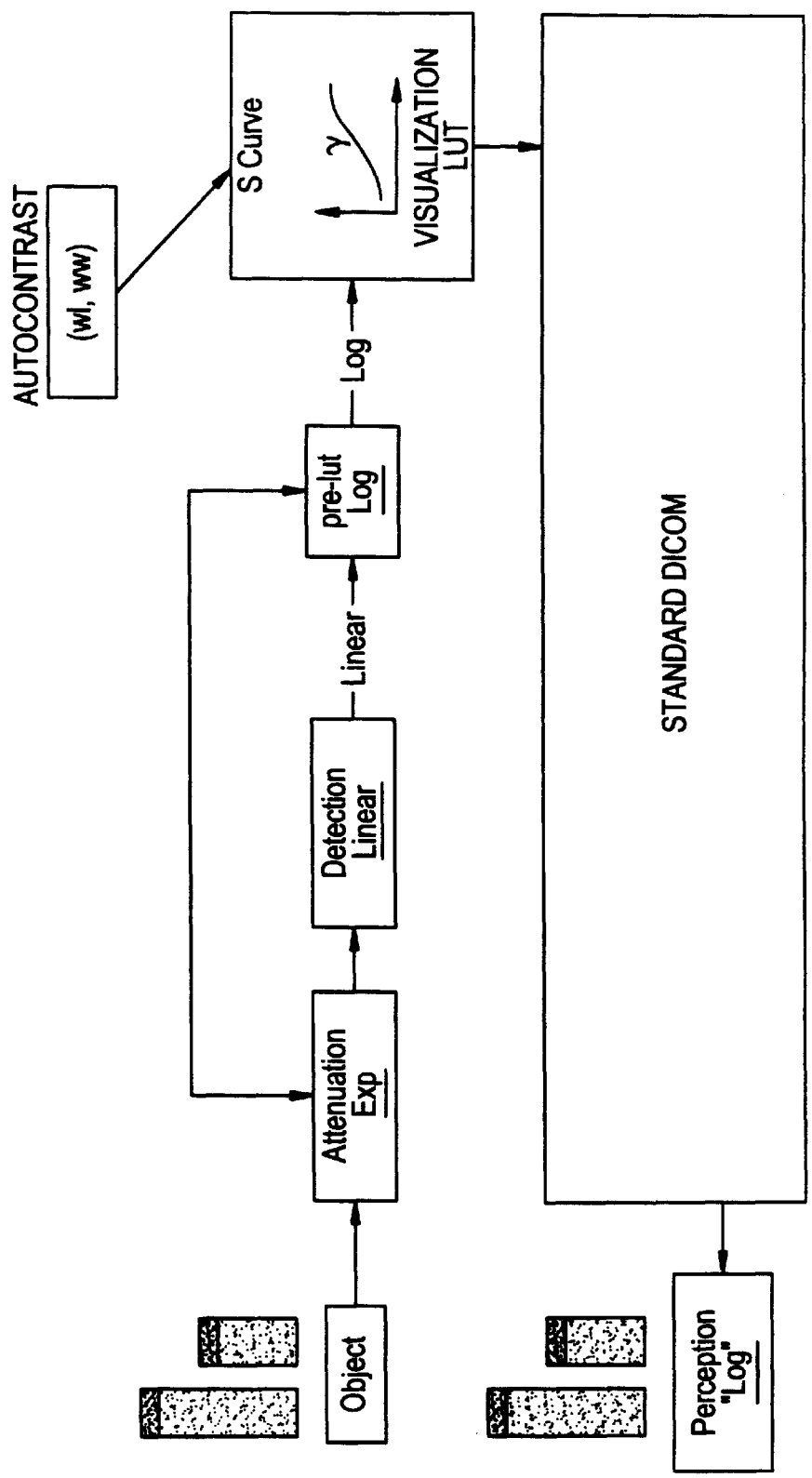
FIG. 4 describes the method of obtaining an invariant contrast.

The result thus obtained may be introduced into the DICOM standard visualization system (Grayscale Standard Display Function, Supplement 28), familiar to persons skilled in the art, in order to visualize the image (FIG. 4).

Various modifications in structure and/or function and/or steps may be made by one skilled in the art without departing from the scope and extent of the invention.

What is claimed is:

1. A method for a radiographic image of an object comprising the steps of:
   a) providing a real histogram of the radiographic image;
   b) providing a mathematical model of an image chain and the object;
   c) determining two values of gray level, defined as gray min and gray max, which delimits a useful zone from the mathematical model of the image chain and the object and of a set of parameters of acquisition, of a detector, of a positioner and of the object;
   d) suppressing a part below gray min and a part above gray max in the real histogram to define a limited histogram;
   e) applying a set of rules to the limited histogram in order to determine a level of brightness;
   f) obtaining the contrast from the level of brightness;
   g) wherein a correlation is made between the limited histogram and a mathematical model of the real histogram in order to determine the value of a radiologic thickness characterizing the object.

2. The method according to claim 1 comprising the steps of:
   a) estimating a coefficient of minimum linear attenuation of the object from known values of the coefficient of linear attenuation of the least attenuant part of the object for the energies of a radiation spectrum determined by the parameters of acquisition; and
   b) determining gray min from the parameters of the detector, the parameters of the positioner, the parameters of acquisition and the parameters of the object, through a mathematical model of the image chain and of the object.

3. The method according to claim 1 comprising the steps of:
   a) estimating a coefficient of maximum linear attenuation of the object either from known values of the coefficient of linear attenuation of the most attenuant part of the object for the energies of a radiation spectrum determined by the parameters of acquisition; and
   b) determining gray min from the parameters of the detector, the parameters of the positioner, the parameters of acquisition and the parameters of the object through the mathematical model of the image chain and the object.

4. The method according to claim 1 wherein the limitation of the real histogram introduces the two gray levels surrounding a zone of gray levels within which the level of brightness is determined.

5. The method according to claim 2 wherein the limitation of the real histogram introduces the two gray levels surrounding a zone of gray levels within which the level of brightness is determined.

6. The method according to claim 3 wherein the limitation of the real histogram introduces the two gray levels surrounding a zone of gray levels within which the level of brightness is determined.

7. The method according to claim 1 wherein the correlation between the limited histogram and the mathematical model of the real histogram is effected by applying a method of minimization of errors between two functions.

8. A method of acquisition of a radiographic image of an object, having an acquisition chain comprising a step of compensating for an effect of exponential attenuation of radiation by using a modified logarithmic function, so that perception of contrast of a given difference of thickness remains invariant regardless of the means of acquisition wherein the modified logarithmic function comprises converting lowest gray levels according to a linear relationship when the logarithmic function is progressively introduced for other gray levels.

9. The method according to claim 8 wherein brightness and contrast, wherein the contrast is obtained from a coefficient of mean attenuation of the image independently of the brightness, are introduced in a visualization step so that the signals from the compensation step are sized in the space of real thickness.

10. The method according to claim 1 wherein the contrast is obtained from one or more parameters selected by the user or fixed a priori.

11. The method according to claim 1 comprising the steps of:

a) estimating a coefficient of maximum linear attenuation of the object from the mathematical thickness of the object under compression, the parameters of acquisition, the mathematical model of the image chain and the object and from a quantity of photons obtained following a pre-exposure performed on a zone of maximum density of the object; and b) determining gray min from the parameters of the detector, the parameters of the positioner, the parameters of acquisition and the parameters of the object through the mathematical model of the image chain and the object.

12. The method according to claim 10 wherein the limitation of the real histogram introduces the two gray levels surrounding a zone of gray levels within which the level of brightness is determined.

13. The method according to claim 11 wherein the limitation of the real histogram introduces the two gray levels surrounding a zone of gray levels within which the level of brightness is determined.

14. The method according to claim 10 wherein a correlation is made between the limited histogram and a mathematical model of the real histogram in order to determine the value of a radiologic thickness characterizing the object.

15. The method according to claim 11 wherein a correlation is made between the limited histogram and a mathematical model of the real histogram in order to determine the value of a radiologic thickness characterizing the object.

* * * * *